US006918720B2

(12) United States Patent
Kopras et al.

(10) Patent No.: US 6,918,720 B2
(45) Date of Patent: Jul. 19, 2005

(54) CIRCLE FORMING ATTACHMENT FOR HAND HELD POWER TOOL

(75) Inventors: Jason R. Kopras, Blue Mounds, WI (US); Cory R. Boudreau, Madison, WI (US); Douglas Seals, Oregon, WI (US)

(73) Assignee: Credo Technology Corporation, Wilmington, DE (US)

( * ) Notice: Subject to any disclaimer, the term of this patent is extended or adjusted under 35 U.S.C. 154(b) by 85 days.

(21) Appl. No.: 10/111,240

(22) PCT Filed: Aug. 10, 2001

(86) PCT No.: PCT/US01/25139

§ 371 (c)(1),
(2), (4) Date: Aug. 26, 2002

(87) PCT Pub. No.: WO02/14030

PCT Pub. Date: Feb. 21, 2002

(65) Prior Publication Data

US 2003/0029623 A1 Feb. 13, 2003

Related U.S. Application Data

(60) Provisional application No. 60/224,851, filed on Aug. 11, 2000.

(51) Int. Cl.[7] .................................................. B23C 1/20

(52) U.S. Cl. ......................... 409/182; 409/179; 144/24; 144/136.95; 33/27.06; 33/27.02; 33/628; 30/310

(58) Field of Search ................................ 409/179, 182, 409/175; 144/24; 33/27.06, 27.01, 27.02, 628, 638, 465, 471; 30/310, 371, 372; 239/289, DIG. 14; 408/79, 72 R, 110; 83/733, 439

(56) References Cited

U.S. PATENT DOCUMENTS 3,068,577 A * 12/1962 Wilson ...................... 33/27.02
3,292,494 A * 12/1966 Anderson et al. ........... 409/179
3,315,361 A 4/1967 Mutter
3,635,268 A 1/1972 Lange
4,016,802 A * 4/1977 O'Connell .................. 409/175
4,350,458 A * 9/1982 Murahara et al. ........... 401/145
4,358,894 A * 11/1982 Augustin ................... 33/27.02
4,542,587 A 9/1985 Emerson
4,685,496 A 8/1987 Livick
4,777,991 A 10/1988 Adame
4,798,506 A * 1/1989 Kulp, Jr. ..................... 409/179
5,090,127 A * 2/1992 Shapiro et al. ............ 33/27.02
5,143,490 A 9/1992 Kopras
5,323,823 A 6/1994 Kopras
5,486,076 A * 1/1996 Hauschopp ................. 409/179
5,515,611 A * 5/1996 Maldonado .............. 33/27.032
5,813,805 A 9/1998 Kopras
5,902,080 A 5/1999 Kopras
6,048,260 A 4/2000 Kopras (Continued)

FOREIGN PATENT DOCUMENTS

| | | |
|---|---|---|
| AU | 10335/66 | 5/1969 |
| DE | 39 17 812 | 12/1990 |
| FR | 2545744 A1 * | 11/1984 |
| GB | 565233 | 11/1944 |
| GB | 2 202 488 | 9/1988 |
| WO | WO-91/15372 A1 * | 10/1991 |

OTHER PUBLICATIONS

"ROTO ZIP Circle Cutter" instructions (4 pages).

*Primary Examiner*—Erica Cadugan
(74) *Attorney, Agent, or Firm*—Foley & Lardner LLP

(57) ABSTRACT

A circle forming apparatus (100) for a power tool and a method for using the apparatus provides for the formation of circles or circular apertures in a workpiece. A first arm (104) and second arm (106) are rotatably coupled, and a fastener allows a user to secure the first arm relative to the second arm. The second arm includes a pivot point (108), and the first arm includes means (102) for coupling the first arm to a power tool.

39 Claims, 11 Drawing Sheets

U.S. PATENT DOCUMENTS

D439,122 S 3/2001 Adler et al.
D439,484 S 3/2001 Adler et al.
6,623,221 B2 * 9/2003 Schostek et al. ............ 409/235
2003/0000599 A1 * 1/2003 Bergner et al. .......... 144/154.5
2003/0228200 A1 12/2003 Talesky et al.

* cited by examiner

CIRCLE FORMING ATTACHMENT FOR HAND HELD POWER TOOL

RELATED APPLICATIONS

This application claims the benefit of U.S. Provisional Application No. 60/224,851, filed Aug. 11, 2000.

FIELD OF THE INVENTION

The present invention relates generally to the field of hand-held power tools, and in particular to an attachment for use in forming circles or circular apertures in a workpiece using a hand-held power tool.

BACKGROUND OF THE INVENTION

A rotary cutting tool is a hand-held power tool having an electric motor that rotates a cutting tool bit at high speeds. Such tools are particularly useful for cutting sheets of material such as drywall and plywood. The cutting tool bit includes a sharp cutting edge that is wrapped in a helix around the axis of the bit. The cutting tool bit is designed for cutting perpendicularly to the axis of the bit. The electric motor that drives the bit is enclosed in a motor housing. The motor housing is generally cylindrical in shape, with the cutting tool bit extending from one end of the motor housing along the axis of the housing. The cutting tool is used to remove material from a workpiece by moving the rotating cutting tool bit through the workpiece in a direction perpendicular to the axis of the rotation of the bit. It is conventionally operated by grasping the motor housing with one or both hands, turning on the electric motor to begin high speed rotation of the cutting tool bit, spinning the cutting bit into a workpiece, such as a piece of wood, and then moving the cutting bit through the workpiece in a direction perpendicular to the axis of the cutting tool bit by moving the motor housing in a direction parallel to the plane of the workpiece surface while keeping the axis of the motor housing generally perpendicular to the workpiece surface.

The utility of a rotary cutting tool may be enhanced by attaching accessories to the cutting tool. For example, although a rotary cutting tool allows a user to form cuts in a workpiece perpendicular to the axis of an attached cutting tool bit, the cuts that are made are generally freehand cuts. Forming a perfect circular cut or aperture in a workpiece may prove difficult without some additional means for ensuring that all points on the cut are equidistant from a center point of the circle. One method commonly used for forming a circle or circular aperture in a workpiece involves drawing a circle with a compass and following the line with the rotary cutting tool. A difficulty with this method is that the rotary cutting tool may slip from the drawn circle.

What is desired, therefore, is an attachment for a rotary cutting tool or other hand-held power tool that allows a user of the power tool to form circles or circular apertures in a workpiece. There is also a need for an attachment that allows the formation of circles or circular apertures having a variety of sizes. There is a further need for an attachment that allows the formation of circles or circular apertures having a smaller diameter than that of the power tool. There is yet a further need for an attachment that includes a measurement scale for determining the size of the circle or circular aperture to be formed by the power tool prior to the formation of the circle or circular aperture. There is even yet a further need for an attachment that allows a user to form circles or circular apertures in a workpiece and also allows the user to set the depth of a cut to be made by the power tool.

It would be desirable to provide an apparatus and/or method that provides one or more of these or other advantageous features. Other features and advantages will be made apparent from the present specification. The teachings disclosed herein extend to those embodiments which fall within the spirit and scope of the appended claims, regardless of whether they accomplish one or more of the above-mentioned needs.

SUMMARY OF THE INVENTION

An exemplary embodiment relates to a circle forming apparatus for a power tool. The circle forming apparatus includes a first arm and a second arm rotatably coupled to the first arm. The first arm includes means for coupling the first arm to a power tool, and the second arm includes a pivot point. The circle forming apparatus also includes a fastener for securing the first arm in a fixed position relative to the second arm.

Another exemplary embodiment relates to a circle forming attachment for a hand-held power tool. The circle forming attachment includes a first arm and a second arm rotatably coupled to the first arm. The second arm includes a pivot pin. The circle forming attachment also includes means for fixably securing the first and second arms in a desired position and a mounting assembly attached to the first arm and configured for attaching to a hand-held power tool.

Yet another exemplary embodiment relates to a circle forming apparatus for a power tool. The circle forming apparatus includes a first arm having a mounting assembly for a hand-held power tool. The mounting assembly includes an adjustable depth guide. The circle forming apparatus also includes a second arm rotatably coupled to the first arm and having a pivot pin. Additionally, the circle forming apparatus includes a fastener for fixably securing the first and second arms in a desired position.

Yet still another exemplary embodiment relates to a method of forming a circle or a circular opening from a workpiece using a hand-held power tool. The method includes fixably securing a first and second arm of a circle forming apparatus in a desired position, attaching a hand-held power tool to the first arm and inserting a pivot point attached to the second arm into a workpiece. Additionally, the method includes rotating the hand-held power tool about the pivot point in order to cut the circle or circular opening from a workpiece.

BRIEF DESCRIPTION OF THE DRAWINGS

The invention will become more fully understood from the following detailed description, taken in conjunction with the accompanying figures, wherein like reference numerals refer to like elements, in which.

DETAILED DESCRIPTION OF THE PREFERRED EMBODIMENTS

Figure 1:
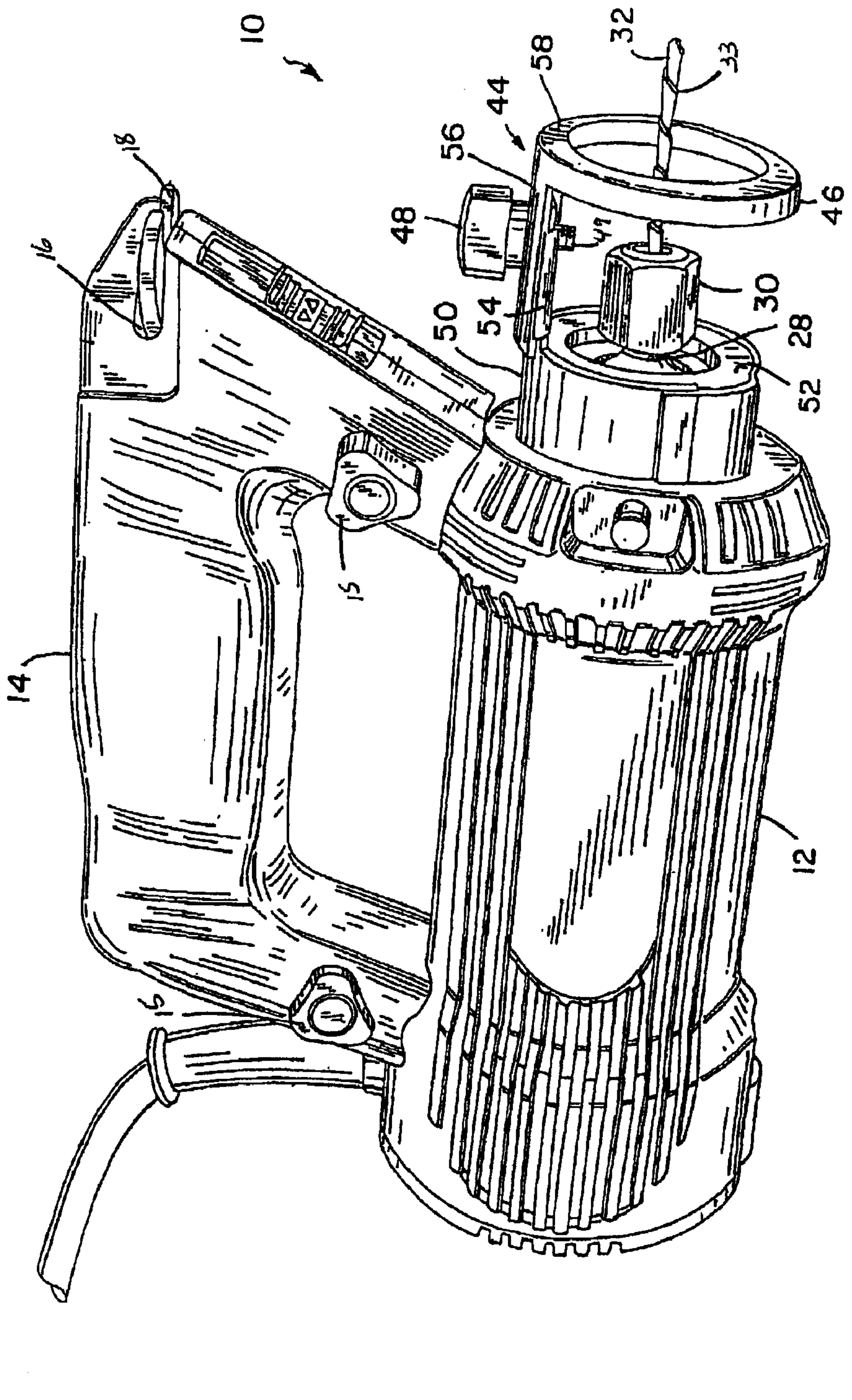
FIG. 1 is a perspective view of one example of a hand-held power tool according to an exemplary embodiment.

Referring to FIG. 1, a power tool or hand-held power tool 10 in the form of a rotary cutting tool is illustrated according to an exemplary embodiment. The power tool 10 may be a Spiral Saw™ tool or any other hand-held power tool. For example, the power tool 10 may be a drill, router, sander, grinder, jigsaw, paint sprayer, or any other hand-held power tool which may be configured for cutting or otherwise forming a circle or a circular aperture in a workpiece.

The power tool 10 includes a motor housing 12 and a handle 14. The handle 14 may be removably attached to the motor housing 12 and one or more fasteners or locking knobs 15 may be provided for removably attaching the handle 14 to the motor housing 12. In another embodiment, the handle 14 may be attached to the motor housing 12 by means of a cam lock device, in which a cam shaft may be inserted into a complementary opening or aperture in the motor housing 12. The handle 14 may also include one or more storage compartments 16. In an exemplary embodiment, a storage compartment 16 is provided in the handle 14 to house at least a portion of a wrench 18 for use with the power tool 10. Other storage compartments may also be included in the handle 14 to provide storage for tool bits and the like.

An electric motor (not shown) is enclosed within the motor housing 12. The electric motor of the power tool 10 drives a motor shaft 28 and one end of the motor shaft 28 preferably extends from an end of the motor housing 12 along the axis thereof. A mechanical structure 30 may be attached to the end of the motor shaft 28 for securing a tool bit 32, such as a cutting tool bit or drill bit. In an exemplary embodiment, tool bit 32 is a cutting tool bit having at least one flute 33 wrapped in a helix about the axis of the bit 32. The flute 33 may be designed such that the cutting tool bit 32, when rotated at high speed, will cut through a workpiece (e.g., wood, marble, drywall, fiberglass, plaster, or tile, etc.) in a direction perpendicular to the axis of the bit 32. Although FIG. 1 illustrates a cutting tool bit 32 having one flute 33, in other embodiments the tool bit 32 may include a different number of flutes 33. For example, the tool bit 32 may include three flutes 33 wrapped in a helix about the tool bit 32. In addition, any other surface configured for cutting, grinding, or otherwise shaping a workpiece may be provided on the tool bit 32. Further, in an alternative embodiment, other devices may be secured within the mechanical structure 30. For example, a sanding, polishing, grinding, or cutting disc may be attached to the mechanical structure 30.

To set the depth of cut to be made by the cutting tool 10, an adjustable depth guide assembly 44 is provided. The depth guide assembly 44 includes a depth guide 46, a fastener or locking knob 48, and a depth guide bracket 50. The depth guide bracket 50 may be attached to the motor housing 12 around the location where the motor shaft 28 emerges from the housing 12. The depth guide bracket 50 may be attached to the cutting tool 10 in various conventional manners. In an exemplary embodiment, the depth guide bracket 50 is removably attached to the motor housing 12.

A housing collar or ring 52, which is a part of and extends axially from the motor housing 12, is preferably provided around the motor shaft 28. The collar 52 may include a recessed channel or groove (not shown) around an outer circumference thereof which interlocks with a protrusion or rib on the depth guide bracket 50. To attach the depth guide bracket 50 to the collar 52, the protrusion of the depth guide bracket 50 may be aligned with a notch (not shown) in the collar 52, after which the bracket may be pushed down over the collar 52 until the protrusion on the bracket 50 is located within the collar channel. The depth guide bracket 50 may then be rotated to lock the protrusion on the bracket 50 within the channel on the collar 52. Alternatively, other means for locking the protrusion within the channel may be used.

The depth guide bracket 50 includes an extension or flange 54 extending in an axial direction from an outer edge thereof. The depth guide bracket extension 54 includes a threaded hole into which the locking knob 48 is threaded. The depth guide 46 includes a corresponding extension or flange 56 extending in an axial direction from an edge thereof, which may be aligned with the depth guide bracket extension 54. When locked into position (as described further below), the depth guide 46 provides a depth guide surface 58 that lies in a plane perpendicular to the axis of the cutting tool bit 32 and parallel to the surface of a workpiece. In operation, the depth guide surface 58 may be placed on a workpiece surface and a user may move the attached power tool 10 along the surface of the workpiece. In an exemplary embodiment, a rotary cutting tool may be mounted to the depth guide, such that moving the depth guide 46 along the surface of a workpiece allows a user to make cuts of a particular depth in the workpiece.

The height of power tool 10 may be set by loosening the locking knob 48, moving the depth guide 46 in an axial direction by sliding the depth guide extension 56 along the depth guide bracket extension 54, and tightening the locking knob 48. The locking knob 48 may include a threaded shaft 49 which may be threadably received in a threaded aperture or hole in the depth guide bracket extension 54. In an alternative embodiment, the aperture or hole in the depth guide bracket extension 54 may not include threads, and the threaded shaft 49 may instead be threaded into a threaded nut or similar structure. The depth guide extension 56 may include a slot along its length through which the threaded shaft 49 may extend. The slot in the depth guide extension 56 may be slightly wider than the width of the threaded shaft 49, to allow sliding movement of the depth guide 56 in relation to the depth guide bracket 50 when the locking knob 48 is not tightened. By threading the locking knob shaft 49 into the threaded aperture in the depth guide bracket 50, the depth guide 56 is sandwiched between the locking knob 48 and the depth guide bracket 50 to prevent movement of the depth guide 56. Thus, when the locking knob 48 is loosened, the depth guide 56 may be slid in an axial direction to a desired position, after which the locking knob 48 may be tightened to lock the depth guide 56 in place. In an exemplary embodiment, a locking washer is preferably placed around the threaded shaft 49 to more securely fix the depth guide 46 in place when the locking knob 48 is tightened.

Figure 2:
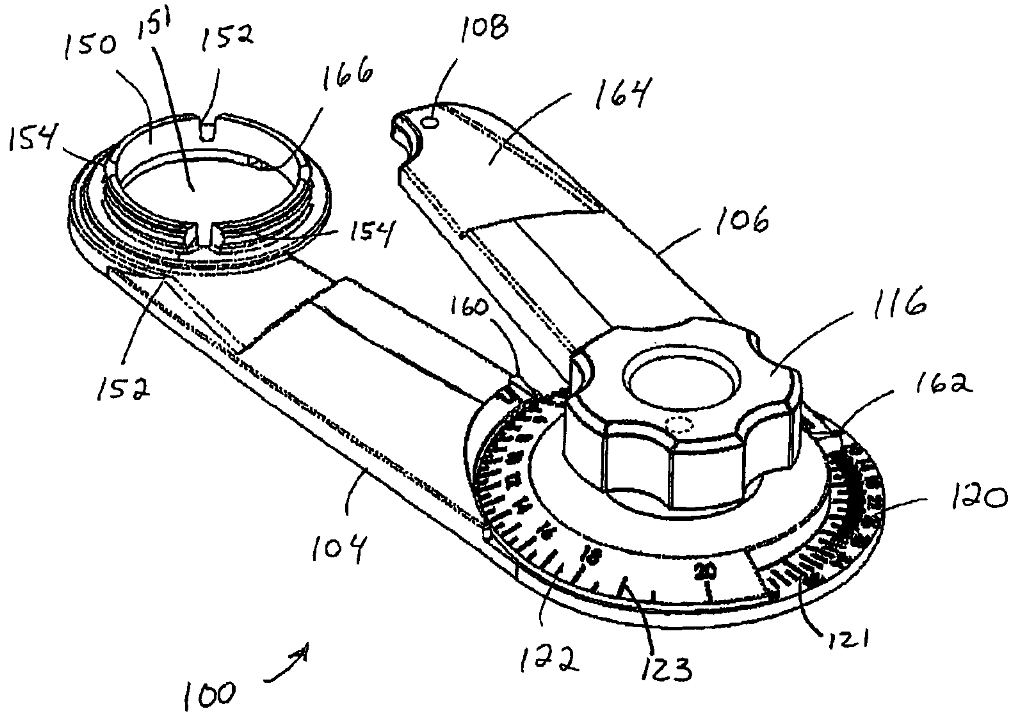
FIG. 2 is a perspective view of a circle forming apparatus for mounting to a hand-held power tool.
Figure 3:
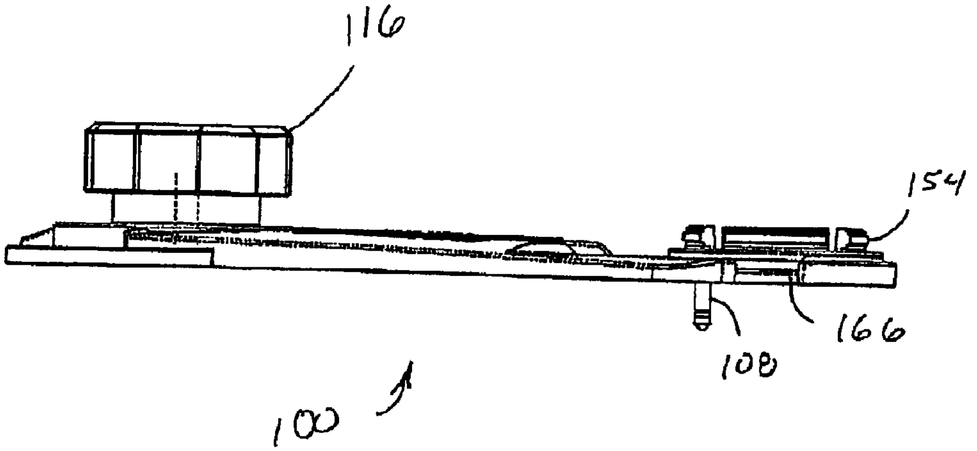
FIG. 3 is a side elevational view of the circle forming apparatus of FIG. 2.
Figure 4:
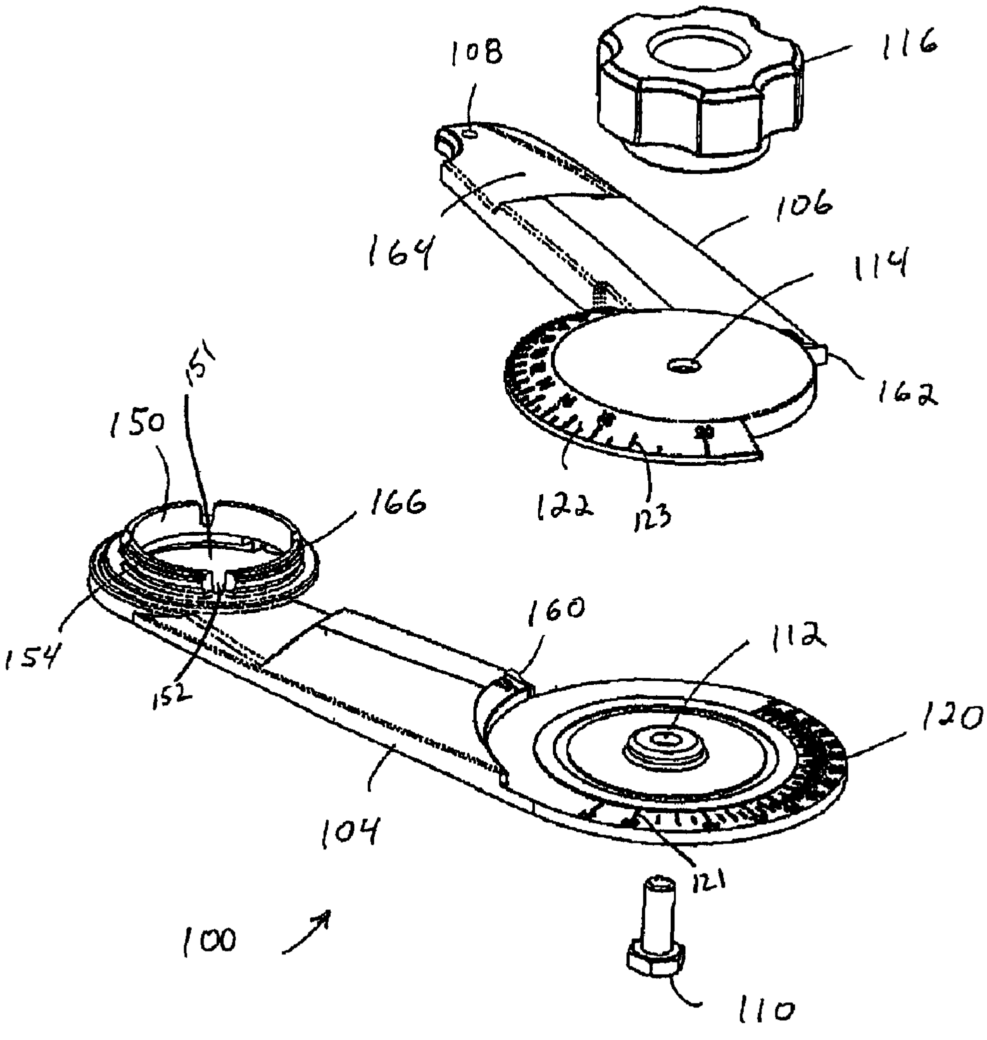
FIG. 4 is an exploded perspective view of the circle forming apparatus of FIG. 2.

FIGS. 2 and 3 are perspective and side views, respectively, of a circle forming apparatus or attachment 100 configured for use with the power tool 10. FIG. 4 is an exploded perspective view of the circle forming attachment 100 illustrated in FIGS. 2 and 3. In an exemplary embodiment, the circle forming attachment 100 comprises a first arm or shaft 104 rotatably coupled to a second arm or shaft 106 about a pin or bolt 110. The end of the first arm 104 opposite the pin 110 may include a mounting collar, the function and design of which will become apparent.

The end of the second arm 106 opposite the point of connection of the first and second arms 104, 106 may include a pivot point or pin 108. In an exemplary embodiment, the pivot point 108 is a generally cylindrical structure which extends from a bottom surface of the second arm 106. The pivot point 108 may be made of metal (e.g., steel, aluminum, magnesium, etc.), plastic (e.g., polyethylene, polypropylene, etc.), or any other suitable material. In one embodiment, the pivot point 108 may be integrally formed with the second arm 106. In another embodiment, the pivot point 108 may be formed separately and attached to the second arm 106. The size, shape, and position of the pivot point 108 may also vary. For example, the pivot point 108 need not be located at the end of the second arm 106, but may instead be located anywhere along the second arm between the end of the second arm and the pin 110. Further, as illustrated in FIG. 2, the pivot point 108 has a generally cylindrical shape and a pointed end. In this embodiment, the pivot point 108 may be inserted into a workpiece that does not include a pre-drilled hole for placement of the pivot point 108. Thus, for soft workpiece materials such as drywall or ceiling tiles, the second arm 106 may be placed on the workpiece and the user may strike the second arm 106 with a hand to force the pivot point 108 into the workpiece. The pivot point 108 may also be inserted into pre-drilled holes in both soft and hard materials. In alternative embodiments, the pivot point 108 may include a non-pointed end, or may have a different shape. For example, the pivot point 108 may be a raised dot having a generally spherical shape, which could be inserted into a workpiece. In another embodiment, the pivot pin 108 may be a sharp, thin pin or nail-like structure.

The first arm 104 and second arm 106 are adapted to pivot about the axis of the pin 110 relative to each other. In this manner, the arms 104, 106 may be arranged in any angular relation or position between the minimum position illustrated in FIG. 9 and the maximum position illustrated in FIG. 11. For instance, the arms 104, 106 may be arranged in the intermediate position shown in FIG. 10 or any other intermediate position between the maximum and minimum positions illustrated in FIGS. 9 and 11.

Figure 7:
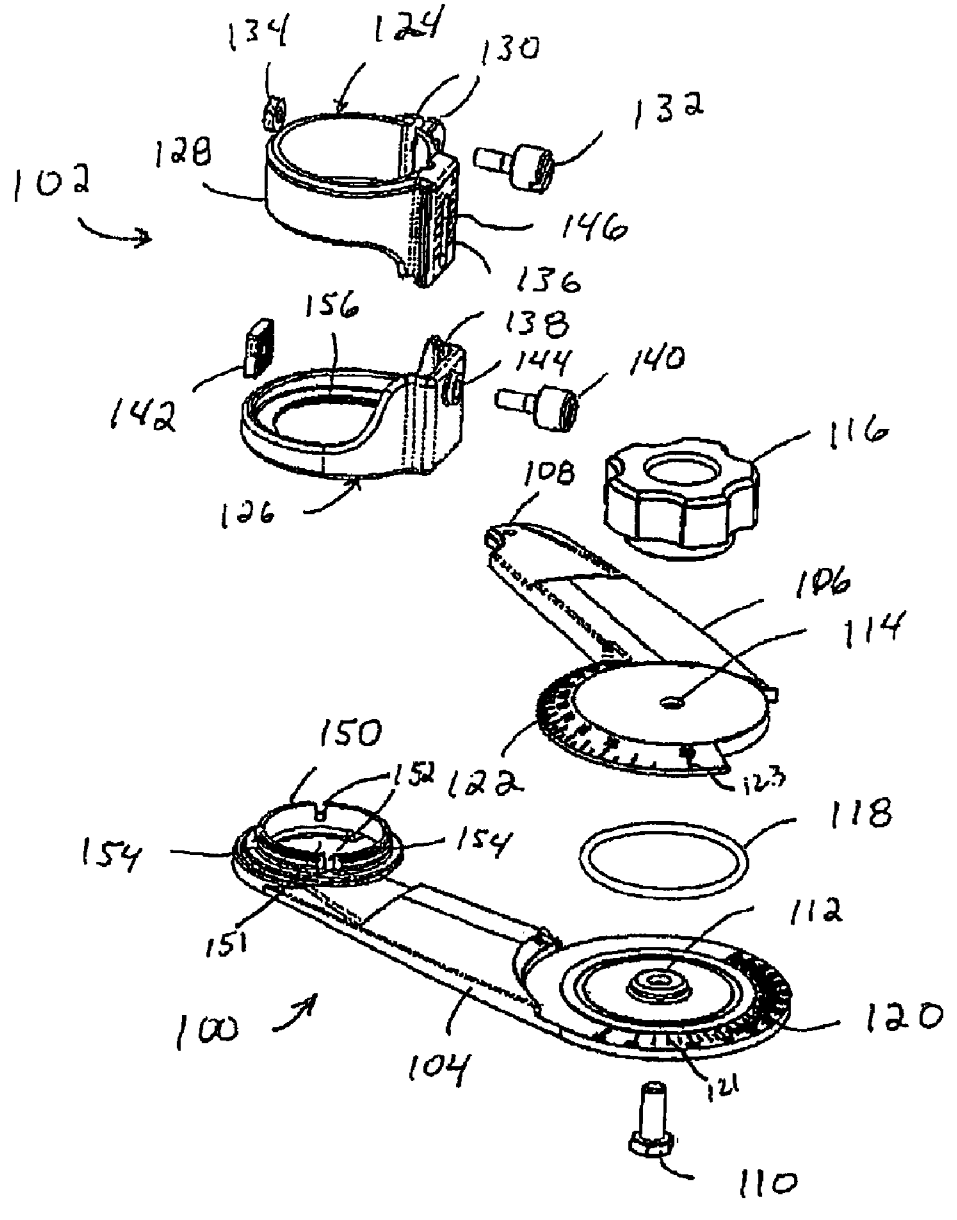
FIG. 7 is an exploded perspective view of the circle forming apparatus and mounting clamp assembly as illustrated in FIG. 5.
Figure 8:
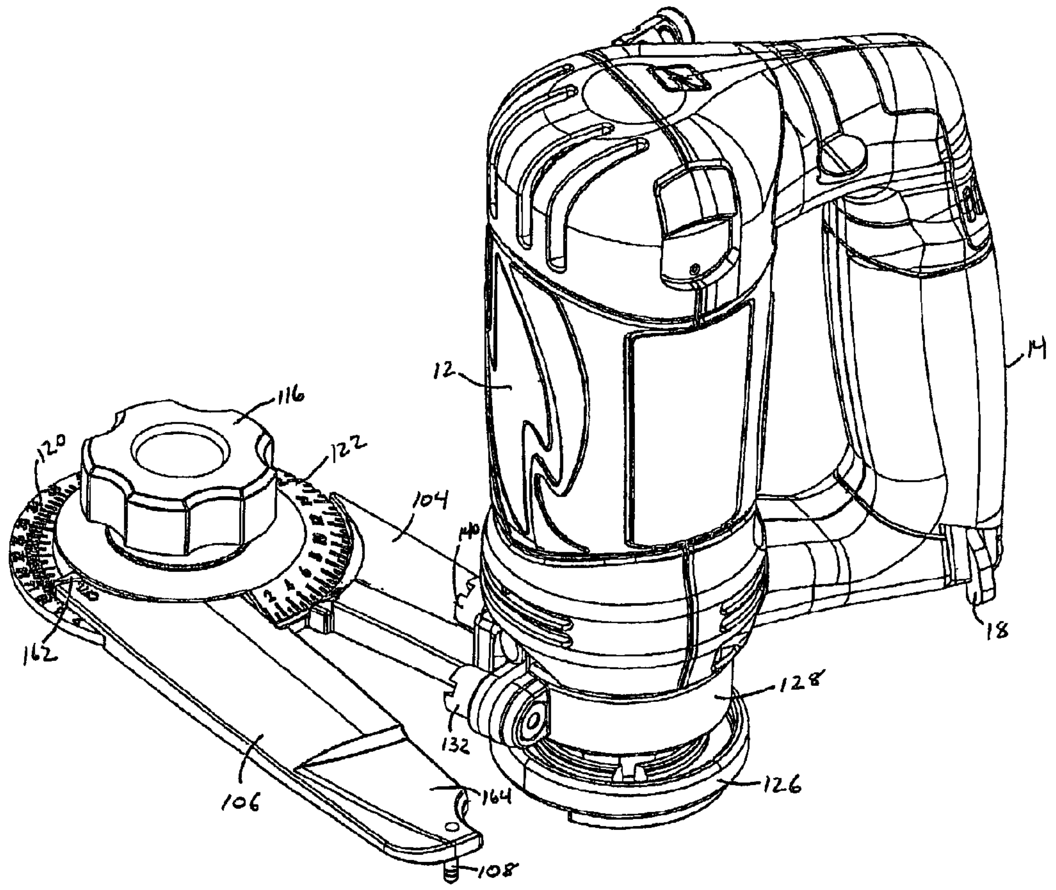
FIG. 8 is a perspective view of the circle forming apparatus of FIG. 2 mounted to a hand-held power tool.

To secure the first arm 104 and second arm 106 in a given position, a fastener or adjustment knob 116 is provided to couple with the pin 110. The fastener may any acceptable type of tightening mechanism, including a simple adjustment knob, a bolt and nut, an over-center latch, a bayonet-style connection, or a quarter-turn fastener. For example a bolt may extend through an aperture in one of the arms and a nut may be fastened thereon. The adjustment knob 116 and pin 110 may be tightened or loosened to permit or retard movement of the second arm 106 relative to the first arm 104 about the axis of the pin 110. A rubber gasket 118 (shown in FIG. 7) may be provided between the opposing surfaces of the first and second arms 104, 106 to permit sliding movement of the arms relative to one another when the adjustment knob 116 is loosened and likewise to frictionally retard movement of the arms when the adjustment knob 116 is tightened. In an exemplary embodiment, the pin 110 may include a threaded shaft which extends through aperture 112 in the first arm 104 and through aperture 114 in the second arm 106. The pin 110 may then be threadably received in a threaded aperture in the adjustment knob 116. In another embodiment, only the terminal end of the pin 110 may include threads for engagement with the adjustment knob 116, and the remainder of the shaft may have a smooth surface to allow free rotation of the first and second arms 104, 106 about the pin 110. In yet another embodiment, the pin may include a hollow interior shaft portion that includes threads for threadably attaching to a threaded extension or bolt included in locking knob 116. In this embodiment, the threaded extension of locking knob 116 may be inserted into the pin shaft and rotated to threadably couple the adjustment knob 116 to the pin 110. It should also be noted that the pin 110 need not be a separate component. For example, the pin 110 may be integrally formed with one of the first or second arms 104, 106, such that the pin may only extend through an aperture formed in one of the arms. One advantageous feature of this embodiment is that fewer parts are required, since the pin 110 may be integrally molded or otherwise formed as part of one of the arms 104, 106.

In each of the above-described embodiments, tightening the adjustment knob 116 will bring the pin 110 and adjustment knob 116 together to frictionally restrict movement of the first arm 104 relative to the second arm 106, thus securing the arms 104, 106 in a desired position. Conversely, loosening the adjustment knob will allow free movement of the arms 104, 106 about the pin 110, so as to allow a user of the circle cutting attachment 100 to select a new desired position.

By arranging the arms 104, 106 in a desired position, a user of the circle forming attachment 100 may alter the size of a circle or circular aperture that may be formed using a power tool 10 attached to the circle forming attachment 100. The pivot point 108 may act as a center of the circle, such that the radius of the circle will be the linear distance from the pivot point 108 to the center of the aperture 151 in the first arm 104 circumscribed by the mounting collar 150. Thus, as the arms 104, 106 are rotated away from one another, the distance between the pivot point 108 and the center of the aperture 151 will increase, so that the corresponding size of a circle or circular aperature formed by a power tool 10 coupled to the circle forming attachment 100 will also increase. For example, a paint sprayer may be secured within the mounting collar 150 such that the spray nozzle is aligned with the center of the aperture 151. A circle may then be formed on a workpiece having a radius equal to the linear distance from the nozzle to the pivot point 108. Similarly, a rotary cutting tool attached to the circle forming attachment 100 such that a tool bit 32 extends through the center of the aperture 151 may cut a circle in a workpiece having a radius equal to the linear distance from the tool bit 32 to the pivot point 108.

Figure 9:
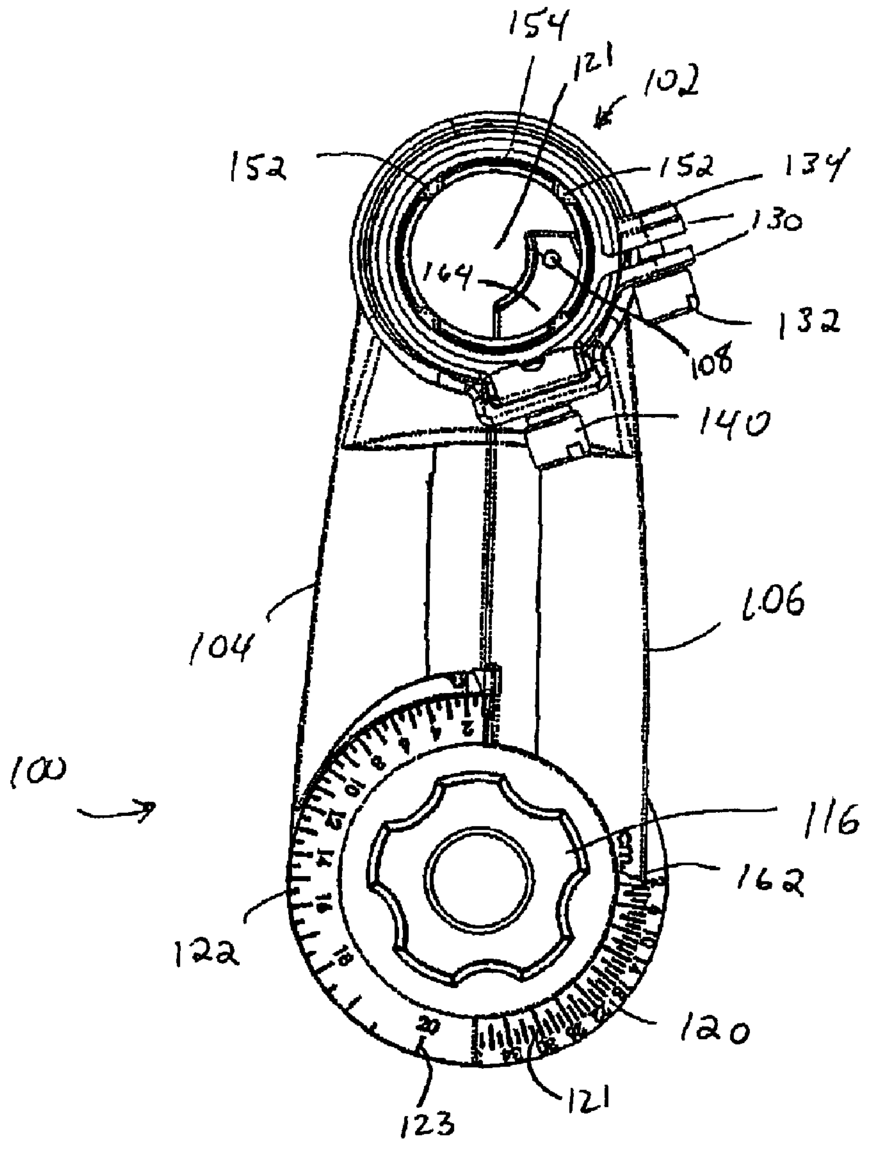
FIG. 9 is a top elevational view of the circle forming apparatus and mounting clamp assembly as shown in FIG. 5, illustrating the apparatus in position for forming a minimum diameter circle.
Figure 10:
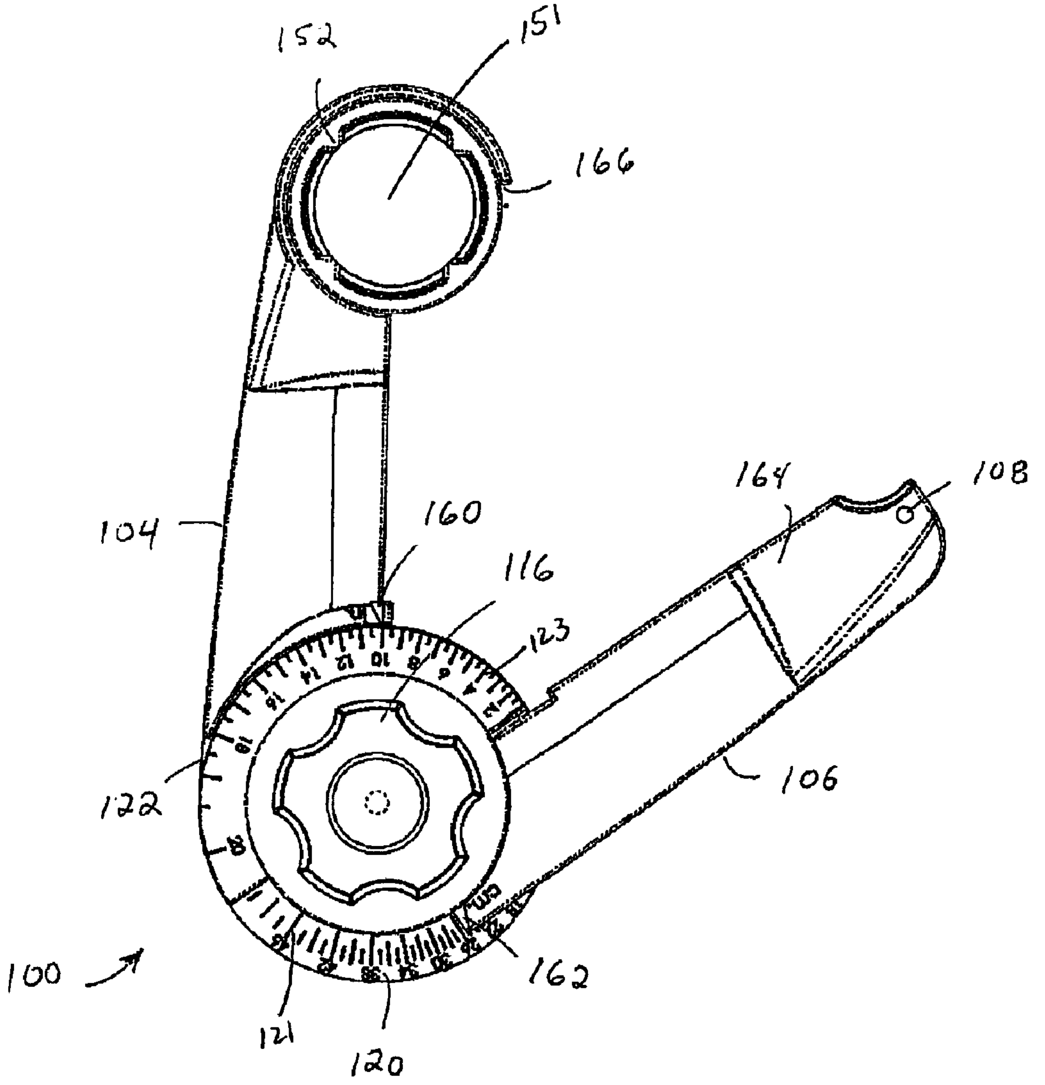
FIG. 10 is a top elevational view of the circle forming apparatus as shown in FIG. 2, illustrating the apparatus in position for forming an intermediate diameter circle.

The size of a circle or circular aperature to be formed using the circle forming attachment 100 may be determined prior to forming the circle. As best shown in FIGS. 1, 9, and 10, the end of the first arm 104 that is adjacent to the pin 110 may be provided with indicia or markings in the form of a first measurement scale 120. Similarly, the end of the second arm 106 that is adjacent to the pin 110 may be provided with indicia in the form of a second measurement scale 122. In an exemplary embodiment, the first measurement scale 120 corresponds to a measurement in centimeters and the second measurement scale 122 corresponds to a measurement in inches. The scales 120, 122 include markings 121, 123 for allowing a user to determine the size of a circle to be formed. In an exemplary embodiment, the markings correspond to the diameter of a circle to be formed. In alternative embodiments, the markings may correspond to the radius or circumference of a circle to be formed.

Figure 5:
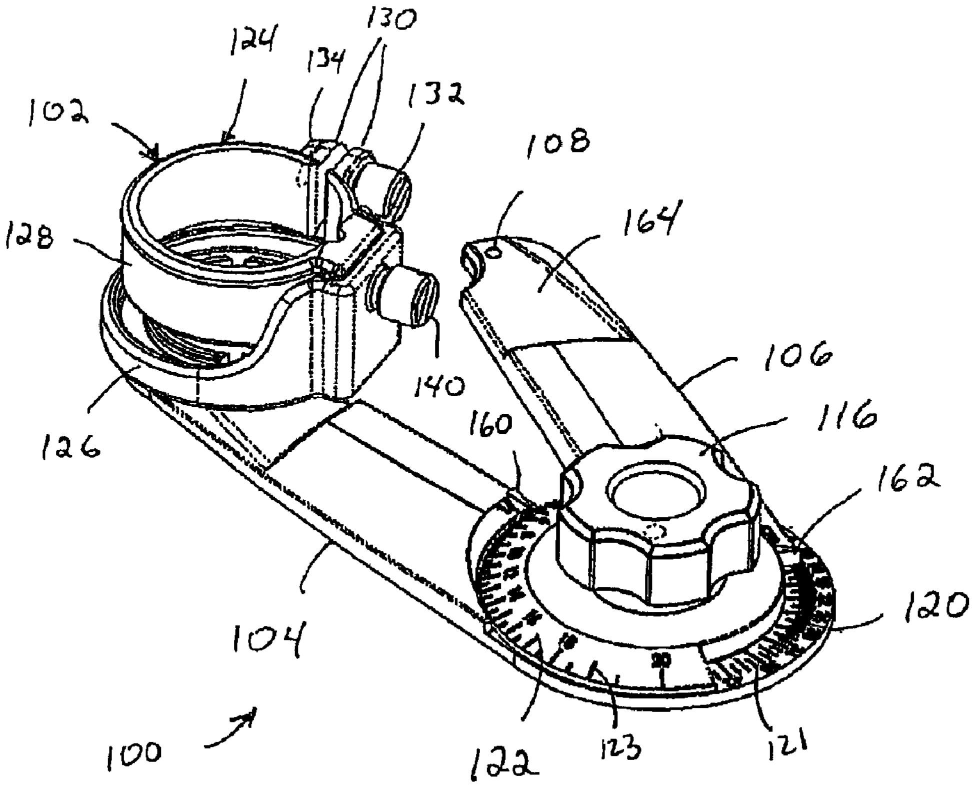
FIG. 5 is a perspective view of the circle forming apparatus of FIG. 2 with an attached mounting clamp assembly.
Figure 6:
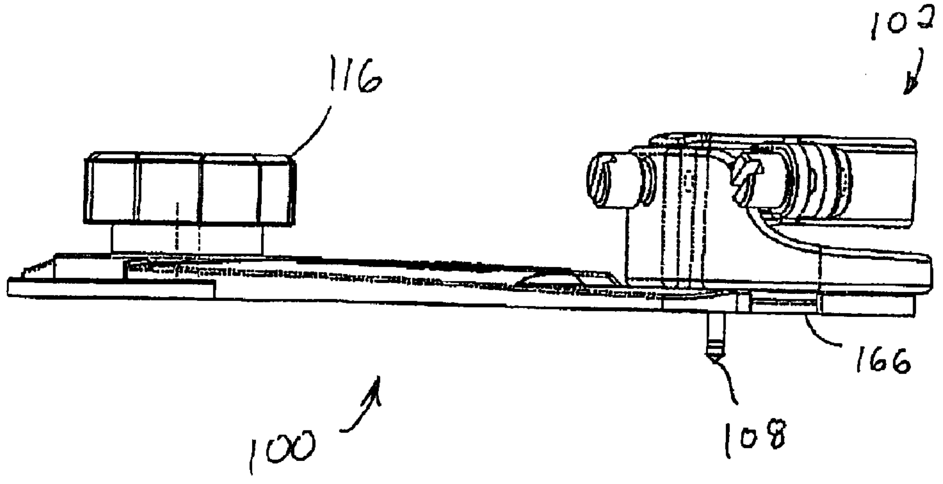
FIG. 6 is a side elevational view of the circle forming apparatus and mounting clamp assembly as illustrated in FIG. 5.

As best shown in FIG. 5, the first arm 104 includes a first indicator or pointer 160 and the second arm 106 includes a second indicator or pointer 162. The point of the first indicator 160 may be aligned with the measurement scale 122 provided on second arm 106, and the second indicator 162 may be aligned with the measurement scale 120 on the first arm 104. A series of lines or ribs may be provided in the scales 120, 122, along with numbers or words representing the diameter of a circle. For instance, every 5 lines may be marked with a number, such that a user may read the number and interpret the size of circle formed when the arms are rotated to a point corresponding to the adjacent line. Thus, to determine the size of a circle to be formed, a user would read one of the measurement scales 120, 122 at the point where one of the indicators 160, 162 is aligned with a line or other marking on the scales 120, 122. For instance, the indicator 160 is illustrated in FIG. 10 as pointing to a marking labeled with a number ten, thus indicating that the circle to be formed will have a diameter of ten inches. Similarly, the second indicator 162 points to a diameter of approximately 25.4 inches on the other measurement scale 120, which is the diameter of a ten-inch circle measured in centimeters.

The circle forming attachment may include means for attaching to a power tool. As shown in FIGS. 5–8, the circle forming attachment 100 may include a mounting clamp assembly or mounting assembly 102 attached to the housing collar 52 for coupling the circle forming attachment 100 to the hand-held power tool 10. The assembly 102 may include a tool clamp 124 which is adjustably mounted to a depth guide clamp 126. In this manner, the mounting clamp assembly 102 may be provided in the form of an adjustable depth guide. The mounting clamp assembly 102 may be rotatably mounted to one end of the first arm 104 such that the mounting clamp assembly may rotate about its axis. In an exemplary embodiment, the tool clamp 124 may have a generally C-shaped body 128. A pair of flanges 130 may extend radially outward from the terminal ends of the body of the tool clamp 128. A fastener 132 such as a screw or bolt may pass through openings (not shown) in the flanges 130, and a nut 134 may be threadably received on the terminal end of the fastener 132. Note that in an alternate embodiment, the mounting clamp assembly need not include an adjustable depth guide, and may instead comprise a fixed-height mounting collar or other similar apparatus into which a power tool 100 may be secured. For example, in the case of a power tool in the form of a paint sprayer, the depth of the paint sprayer may be irrelevant, so that the mounting clamp assembly may only be required to secure the paint sprayer at a single, fixed level. In such a case, an adjustable depth guide need not be included. Additionally, any other device for securing the circle forming attachment 100 to a power tool may also be used. For example, a clip may be included which fastens to a power tool 10. In another example, a pin or bolt may extend from the circle forming attachment 100 for mating with an aperture in a power tool 10. In another embodiment, the means for attaching the circle forming attachment 100 to a power tool 10 may be integrally formed with the circle forming attachment 100. Thus, instead of rotating about its axis to allow rotation of the power tool within the attachment means, the power tool 10 may include bearings or a slidably attached collar which may allow free rotation of the power tool 10 within the attachment means.

To attach the power tool 10 to the mounting clamp assembly 102, the fastener 132 and nut 134 are loosened, so that the tool clamp 124 may be telescopically received on the housing collar 52 (FIG. 10) of the tool housing 12. The fastener 132 and nut 134 may then be tightened to securely mount the tool clamp 124 to the cutting tool 10. Tightening the fastener 132 and nut 134 forces the flanges 130 together, which causes the C-shaped body of the tool clamp 124 to tightly engage the tool housing 12. Note that the depth guide assembly 44 (FIG. 1) must be removed from the tool 10 before the tool clamp 124 may be secured thereto.

The depth guide clamp 126 may be adjustably mounted to the tool clamp 124 through the cooperation of a rail 136 provided along one edge of the tool clamp 124 and a complimentary channel 138 provided in the depth guide clamp 126. The rail 136 slides along the length of the channel 138 to permit movement of the depth guide clamp 126 relative to the tool clamp 124 in a direction parallel to the axis of the bit 32 (FIG. 10).

The position of the depth guide clamp 126 relative to the tool clamp 124 may be secured by a fastener 140 such as a screw or bolt that passes through apertures provided in the tool clamp 124 and the depth guide clamp 126. A nut 142 may also be provided for threadably coupling to the end of the fastener 140. Alternatively, the fastener may be threadably received in a threaded aperture included in depth guide clamp 126. In an exemplary embodiment, the aperture 144 included in the depth guide clamp 126 is circular and receives the shaft of the fastener 140. The aperture 146 of the tool clamp 124 may constitute an elongated slot to permit sliding movement of the shaft of the screw 140 along the length of the aperture 146 to a desired position. The tool clamp 124 may then be slid to a desired position and the fastener 140 may be tightened to secure the tool clamp in the desired position.

As noted previously, the mounting clamp assembly 102 is rotatably mounted to the end of the first arm 104. A substantially cylindrical mounting collar 150 extends upwardly from the top surface of the first arm 104. Small cutouts or interruptions 152 are provided intermittently around the perimeter of the mounting collar 150. Any suitable number, shape, or configuration of cutouts 152 may be provided. A substantially circular flange 154 projects outwardly from the exterior, side surface of the mounting collar 150. As with the remainder of the mounting collar 150, the flange 154 may be interrupted by the cutouts 152. In an alternative embodiment, a plurality of projections or ribs may serve a similar function to flange 154, as will presently be described.

The mounting clamp assembly 102 is mounted to the first arm 104 through the cooperation of the mounting collar 150 and flange 154 with the depth guide clamp 126. The depth guide clamp 126 includes a circular flange 156 which extends radially inwardly from the body of the depth guide clamp 126. In an exemplary embodiment, the inside diameter of the flange 156 is slightly larger than the outside diameter of the mounting collar 150, but less than the outside diameter of the flange 154. In assembling the first arm 104 to the depth guide clamp 126, the mounting collar 150 and flange 154 are telescopically received inside the flange 156 of the depth guide clamp 126. In order to receive the mounting collar 150 and flange 154 within the diameter of the flange 156, the mounting collar 150 and flange 154 must deflect inwardly a small amount to accommodate the relative diameter of the flange 156. Thus, the mounting collar 150 and flange 154 may be made of a material which will allow for some deflection when the components are assembled. For example, molded plastic such as polypropylene or polyethylene may be used to form mounting collar 150 and flange 154. The cutouts 152 provided in the mounting collar 150 and flange 154 permit elastic deformation of the collar 150 and flange 154. Once the collar 150 and flange 154 are received a sufficient distance inside the flange 156, the collar 150 and flange 154 may snap back to their undeformed shape. Because the diameter of the flange 154 of the mounting collar 150 is slightly larger than the diameter of the flange 156 of the depth guide clamp 126, the mounting clamp assembly 102 will be secured to prevent accidental removal of the mounting clamp assembly 102 from the arm 104. The relative diameters of the mounting collar 150, flange 154, flange 156, and body of the depth guide clamp 126 are configured so that the depth guide clamp 126 can freely rotate about the mounting collar 150 but not be inadvertently removed therefrom.

The method of using the circle forming attachment will now be described with reference to FIGS. 2–11. First, the mounting clamp assembly 102 is mounted to the end of the first arm 104. The mounting clamp assembly 102 may be removed after use and mounted on arm 104 every time a user wishes to use the circle forming attachment 100, or may be permanently attached to the circle forming attachment 100. Next, the adjustment knob 116 is loosened and the second arm 106 is rotated relative to the first arm 104 until the desired size of the circle to be formed has been selected. Alternatively, the first arm 104 may be rotated relative to the second arm 106. One means for establishing the size of a circle is through the use of the measurement scales 120 and 122, which as illustrated in the figures may be used to determine the diameter of a circle to be formed. As shown in FIGS. 2, 4, and 9–11, a first indicator 160 is provided on the first arm and a second indicator 162 is provided on the second arm. The first indicator 160 points to the measurement scale 122 provided on the second arm 106 and the second indicator 162 points to the measurement scale 120 provided on the first arm 104.

Figure 11:
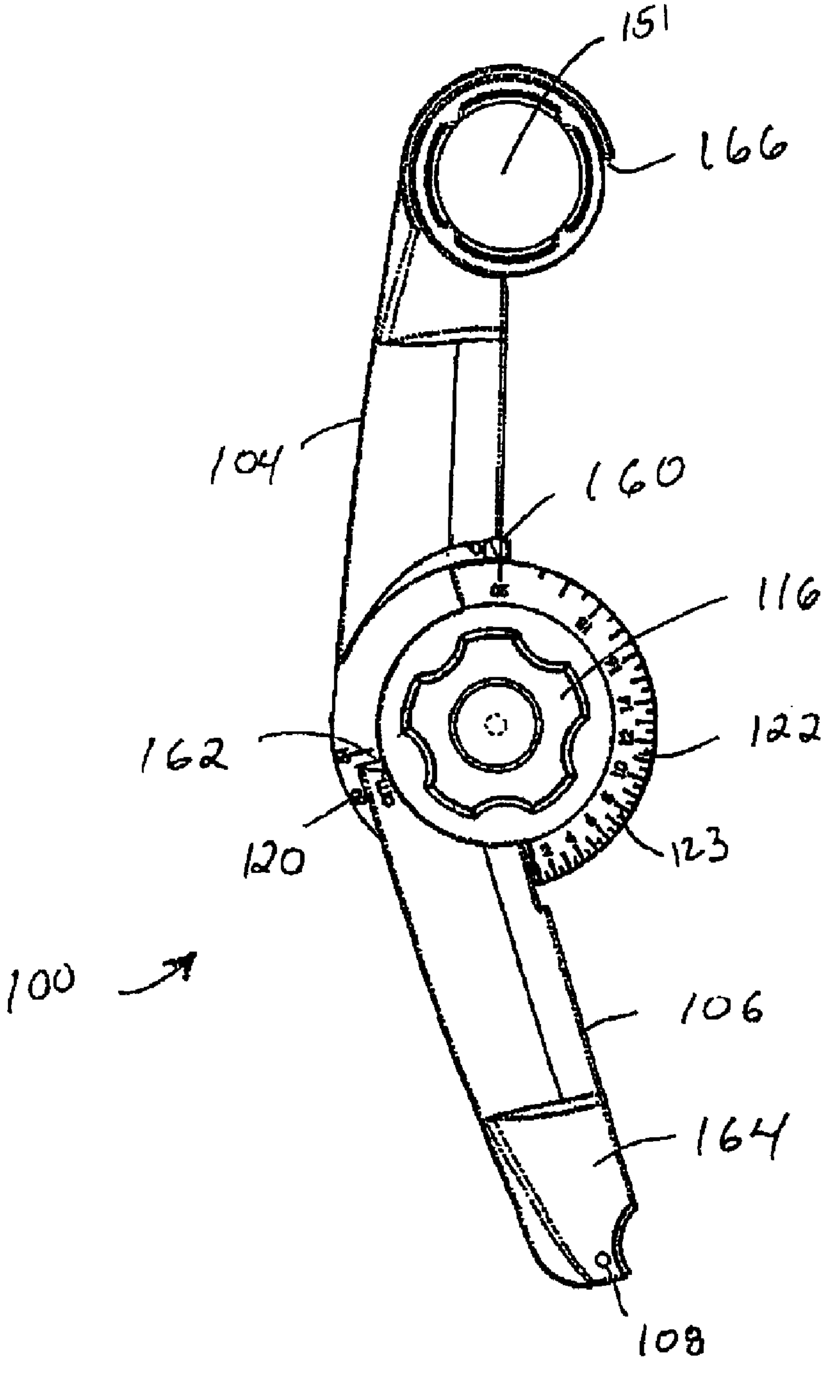
FIG. 11 is a top elevational view of the circle forming apparatus as shown in FIG. 2, illustrating the apparatus in position for forming a maximum diameter circle.

As the first and second arms 104, 106 are rotated relative to one another, the measurement scales 120 and 122 are rotated relative to the respective indicators 160 and 162, and the size of the circle to be formed may be selected. For example, FIG. 9 illustrates a circle cutting attachment with arms in a closed position. In this position, the indicator 160 shows that a circle of one inch would be formed. FIGS. 10 and 11 illustrate the positions of first and second arms 104, 106 required to create circles having diameters of ten inches and twenty inches, respectively. In an exemplary embodiment, the second indicator 162 provides the corresponding measurement in centimeters. Thus, circles from one to twenty inches in diameter may be formed using the particular exemplary embodiment illustrated in FIGS. 9–11. Circles smaller than one inch and larger than twenty inches in diameter may be formed in alternative embodiments. For example, circles greater than twenty inches in diameter may be formed if one or both of the first and second arms 104, 106 is extended, since the distance from the pivot point 108 to the center of the aperture 151 would be greater.

One advantageous feature of the illustrated embodiment of the circle forming attachment 100 is that it permits forming a circle that has a diameter smaller than that of the mounting clamp assembly 102, and hence, smaller than the diameter of the power tool 100 attached to the end of the first arm 104. As shown in FIG. 2, an end portion of the second arm may include a depression or narrowed region 164 formed in the top surface thereof. As such, a portion of the second arm 106 has a reduced thickness compared to the remainder of the second arm 106. A slot 166 may also be formed in a portion of the bottom surface of the first arm 104. The slot 166 is configured to be complementary to the configuration of the reduced thickness of the second arm 104. As seen in FIG. 9, with this configuration, the end of the second arm 106 including the pivot point 108 may be received underneath the mounting clamp assembly 102 such that it is closely adjacent to the center of the aperture 151. In an exemplary embodiment, this permits the creation of circles as small as one inch in diameter. In alternative embodiments, circles may be formed having diameters smaller than one inch. For example, the first and second arms 104, 106 may be formed such that the pivot point 108 is closer to the center of the aperture 151 when the first and second arms 104, 106 are in the closed position.

After the size of the circle to be formed using the circle forming attachment 100 has been chosen, a user of the circle forming attachment 100 may secure a power tool 10 to the mounting clamp assembly 102. Alternatively, the power tool 10 may be secured to the mounting clamp assembly 102 prior to choosing the size of the circle to be formed. In an exemplary embodiment, the mounting clamp assembly comprises an adjustable depth guide that may be adjusted to position the power tool 10 at a desired height. In the case of a rotary cutting tool, the depth of cut may be selected by adjusting the depth guide to a desired position.

Once the power tool 10 is secured to the circle forming attachment 100, a user may form a circle in a workpiece. In an exemplary embodiment, a user may make a pilot hole in the workpiece which will serve as a center for a circle to be formed in the workpiece. To make a pilot hole in the workpiece, the power tool 10 is turned on and a tool bit 32 begins to rotate. The tool bit is then plunged into the workpiece at the location of the pilot hole. In an exemplary embodiment, the tool bit 32 is plunged into the workpiece at a 45° angle, and then slowly rotated to a 90° angle (e.g., perpendicular to the surface of the workpiece). In alternative embodiments, the tool bit 32 may be inserted into the workpiece at any acceptable angle for forming a pilot hole in a workpiece. After a pilot hole is formed in the workpiece, the tool bit 32 is removed from the workpiece, and the power tool 10 may be turned off. The pivot point 108 in the second arm 106 is then lined up with the pilot hole formed in the workpiece. The pivot point 108 may then be inserted into the pilot hole. Simultaneously with the insertion of the pivot point 108 into the pilot hole, the tool bit 32 may be plunged into the workpiece. Since the pivot point 108 is located at the center of the circle to be formed by virtue of its placement within the pilot hole, the point at which the tool bit 32 is plunged into the workpiece will lie along the circumference of the circle. Once the tool bit 32 has been plunged into the workpiece, the power tool 10 may be rotated about the pivot point 108 to form a circle in the workpiece. In certain cases, it may be desirable for the user to apply some pressure to the location of the pivot point 108, to ensure that the pivot point 108 does not become dislodged from the pilot hole. In an alternative embodiment, no pilot hole need be formed by the user of the power tool 10. In this embodiment, a point on the end of the pivot point 108 may allow a user to plunge the pivot point 108 into a workpiece without forming a pilot hole in the workpiece, as may be the case with softer materials such as ceiling tiles or drywall.

Although the present invention has been described with reference to certain exemplary embodiments, those of skill in the art will recognize that changes may be made in form and detail without departing from the spirit and scope of the invention as delineated in the appended claims. Those skilled in the art will appreciate that certain of the advantages disclosed herein may be obtained separately by reconfiguring or otherwise modifying the foregoing structure. For example, although the adjustment knob 116 is illustrated as having a particular shape, other shapes are possible. Instead of having five projecting portions as illustrated in the Figures, any number of projecting portions may be provided.

What is claimed is:

1. A circle forming apparatus comprising:

a first arm including a mounting member configured for coupling the first arm to a power tool, the mounting member comprising an aperture formed therein, the aperture being configured for coupling the mounting member to a power tool;

a power tool coupled to the mounting member;

a tool bit coupled to the power tool, the tool bit having a cutting edge wrapped in a spiral about the tool bit for forming cuts in a workpiece in a direction substantially perpendicular to an axis of rotation of the tool bit;

a second arm rotatably coupled to the first arm, the second arm including a pivot point; and a fastener for securing the first arm in a fixed position relative to the second arm.

2. The circle forming apparatus of claim 1, wherein the mounting member comprises an adjustable depth guide.

3. The circle forming apparatus of claim 1, wherein the mounting member may rotate with respect to the first arm.

4. The circle forming apparatus of claim 1, wherein the linear distance from the center of the aperture to the pivot point equals the length of a radius of a circle that may be formed by rotating a power tool coupled to the first arm about the pivot point.

5. The circle forming apparatus of claim 1, wherein the pivot point is a pin extending from the second arm.

6. The circle forming apparatus of claim 1, wherein the pivot point is configured for providing a center point for a circle to be formed using the circle forming apparatus.

7. The circle forming apparatus of claim 1, wherein the power tool is a rotary cutting tool.

8. The circle forming apparatus of claim 1, wherein the fastener comprises a nut threadably coupled to a bolt, the bolt extending through at least one of the first and second arms.

9. The circle forming apparatus of claim 1, wherein at least one of the first and second arms comprises indicia for setting the size of a circle to be formed using the circle forming apparatus.

10. The circle forming apparatus of claim 1, further comprising a gasket configured for frictionally retarding movement of the arms with respect to one another when the fastener is tightened.

11. The circle forming apparatus of claim 1, wherein the second arm comprises a slot for receiving therein at least a portion of the first arm.

12. A circle forming apparatus comprising:

a first arm including a mounting member configured for coupling the first arm to a power tool;

a power tool coupled to the mounting member;

a tool bit coupled to the power tool, the tool bit having a cutting edge wrapped in a spiral about the tool bit for forming cuts in a workpiece in a direction substantially perpendicular to an axis of rotation of the tool bit;

a second arm rotatably coupled to the first arm, the second arm including a pivot point; and a fastener for securing the first arm in a fixed position relative to the second arm;

wherein the fastener comprises mounting collar.

13. A circle forming apparatus comprising:

a first arm including a mounting member configured for coupling the first arm to a power tool:

a power tool coupled to the mounting member;

a tool bit coupled to the power tool, the tool bit having a cutting edge wrapped in a spiral about the tool bit for forming cuts in a workpiece in a direction substantially perpendicular to an axis of rotation of the tool bit;

a second arm rotatably coupled to the first arm, the second arm including a pivot point; and a fastener for securing the first arm in a fixed position relative to the second arm;

wherein the pivot point is configured for insertion into a workpiece.

14. A circle forming apparatus comprising:

a first an including a mounting member configured for coupling the first arm to a power tool;

a power tool coupled to the mounting member;

a tool bit coupled to the power tool, the tool bit having a cutting edge wrapped in a spiral about the tool bit for forming cuts in a workpiece in a direction substantially perpendicular to an axis of rotation of the tool bit;

a second arm rotatably coupled to the first arm, the second arm including a pivot point; and a fastener for securing the first arm in a fixed position relative to the second arm;

wherein the fastener comprises one of an adjustment knob,an over-center latch, a bayonet-style connection, and a quarter-turn fastener.

15. A circle forming assembly comprising:

a first arm;

a second arm rotatably coupled to the first arm, the second arm including a pivot pin configured for into a workpiece;

means for fixably securing the first and second arms in a desired position; and a mounting assembly attached to the first arm and configured for attaching to a hand-held power tool, the mounting assembly having an axis;

a hand-held power tool coupled to the mounting assembly, the hand-held power tool having a cutting tool bit coupled thereto, the cutting tool bit having a cutting edge wrapped in a helix about the cutting tool bit.

16. The circle forming assembly of claim 15, wherein the mounting assembly comprises an adjustable depth guide.

17. The circle forming assembly of claim 15, wherein the mounting assembly may rotate about its axis.

18. The circle forming assembly of claim 15, wherein the pivot pin is configured for providing a center point for a circle to be formed using the circle forming attachment.

19. The circle forming assembly of claim 15, wherein the pivot pin is integrally formed with the second arm.

20. The circle forming assembly of claim 15, wherein the hand-held power tool is a rotary cutting tool.

21. The circle forming assembly of claim 15, wherein the means for fixably securing the first and second arms comprises an adjustment knob threadably coupled to a pin extending through at least one of the first and second arms.

22. The circle forming assembly of claim 15, wherein the means for fixably securing the first and second arms comprises a nut threadably coupled to a bolt, the bolt extending through at least one of the arms.

23. The circle forming assembly of claim 15, wherein at least one of the first and second arms comprises indicia for setting the size of a circle.

24. The circle forming assembly of claim 15, wherein the mounting assembly has a diameter and wherein the first and second arms are cofigured for allowing the formation by the hand-held power tool of circles with the hand-held power tool having diameters smaller than the diameter of the mounting assembly.

25. A circle forming apparatus comprising:

a first arm, the first arm including a mounting assembly for a hand-held power tool, the mounting assembly comprising an adjustable depth guide, wherein a first portion of the depth guide is configured for coupling to a hand-held power tool and for sliding movement relative to a second portion of the depth guide to adjust a depth of cut for the hand-held power tool;

a second arm including a pivot pin, the second arm being rotatably coupled to the first arm; and a fastener for fixably securing the first and second arms in a desired position.

26. The circle forming apparatus of claim 25, wherein the depth guide may rotate relative to the first arm.

27. The circle forming apparatus of claim 25, wherein the pivot pin is configured for insertion in a workpiece and for forming a center point for a circle to be formed from the circle forming apparatus.

28. The circle forming apparatus of claim 25, wherein the hand-held power tool is a rotary cutting tool.

29. The circle forming apparatus of claim 25, wherein the fastener comprises an adjustment knob threadably coupled to a pin, the pin extending through at least one of the first and second arms.

30. The circle forming apparatus of claim 25, wherein at least one of the first and second arms comprises a scale for indicating the size of a circle to be formed using the circle forming apparatus.

31. The circle forming apparatus of claim 25, wherein the first and second arms are configured for allowing the formation of circles having diameters of between 1 and 20 inches.

32. A circle forming apparatus for a power tool, comprising:

a first arm, the first arm including a mounting assembly for a hand-held power tool, the mounting assembly comprising an adjustable depth guide;

a second arm including a pivot pin, the second arm being rotatably coupled to the first arm; and a fastener for fixably securing the first and second arms in a desired position;

wherein the depth guide comprises a tool clamp slidingly coupled to a depth guide clamp.

33. A method of forming a circle using a hand-held power tool, comprising:

fixably securing a first and second arm of a circle forming apparatus in a desired position;

attaching a hand-held power tool to the first arm by inserting the hand-held power tool into a mounting assembly and tightenting a fastener to secure the hand-held power tool within the mounting assembly, the hand-held power tool having a tool bit coupled thereto, the power tool configured to rotate the bit about an axis;

inserting a pivot point attached to the second arm into a workpiece; and rotating the hand-held power tool about the pivot point to form cuts in the workpiece in a direction substantially perpendicular to the axis.

34. The method of claim 33, wherein fixably securing the first and second arms in a desired position comprises the step of rotating at least one of the arms relative to the other of the arms.

35. The method of claim 33, wherein fixably securing the first and second arms in a desired position comprises the step of tightening a fastener to secure the first and second arms in the desired position. mounting assembly and tightening a fastener to secure the hand-held power tool within the mounting assembly.

36. The method of claim 33, wherein the mounting assembly comprises an adjustable depth guide.

37. The method of claim 33, wherein inserting the pivot point into a workpiece comprises the step of inserting the pivot pin into a hole formed in the workpiece.

38. The method of claim 33, wherein inserting the pivot pin into a workpiece comprises the step of forcing the pivot pin into a surface of the workpiece.

39. The method of claim 33, wherein the hand-held power tool comprises a rotary cutting tool.

* * * * *

UNITED STATES PATENT AND TRADEMARK OFFICE

CERTIFICATE OF CORRECTION

PATENT NO. : 6,918,720 B2 
DATED : July 19, 2005
INVENTOR(S) : Jason R. Kopras, Cory R. Boudreau and Douglas Seals It is certified that error appears in the above-identified patent and that said Letters Patent is hereby corrected as shown below:

Column 12,
Line 5, please replace "fastener" with -- mounting member --, and before "mounting collar" please insert -- a --.
Line 8, please replace ":" with -- ; --.
Line 21, please replace "an" with -- arm --.

Signed and Sealed this

Eighteenth Day of October, 2005

JON W. DUDAS
*Director of the United States Patent and Trademark Office*

UNITED STATES PATENT AND TRADEMARK OFFICE

CERTIFICATE OF CORRECTION

PATENT NO. : 6,918,720 B2 
DATED : July 19, 2005
INVENTOR(S) : Jason R. Kopras, Cory R. Boudreau and Douglas Seals It is certified that error appears in the above-identified patent and that said Letters Patent is hereby corrected as shown below:

Column 12,
Line 5, please replace “fastener” with -- mounting member --, and before “mounting collar” please insert -- a --.
Line 8, please replace “:” with -- ; --.
Line 21, please replace “an” with -- arm --.
Line 38, after “for” insert -- insertion --.

Column 13,
Line 8, replace “cofigured” with -- configured --.

Column 14,
Line 16, replace “tightenting” with -- tightening --.
Line 19, before “bit” insert -- tool --.
Lines 32-34, delete “mounting assembly and tightening a fastener to secure the hand-held power tool within the mounting assembly.”.

This certificate supersedes Certificate of Correction issued October 18, 2005.

Signed and Sealed this

Fourteenth Day of March, 2006

JON W. DUDAS
*Director of the United States Patent and Trademark Office*